United States Patent
Yuan

(10) Patent No.: US 8,120,514 B2
(45) Date of Patent: Feb. 21, 2012

(54) CONTROLLER AND ELECTRONIC DEVICE USING THE SAME

(75) Inventor: Hai-Wei Yuan, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 711 days.

(21) Appl. No.: 12/262,179

(22) Filed: Oct. 30, 2008

(65) Prior Publication Data

US 2009/0303086 A1 Dec. 10, 2009

(30) Foreign Application Priority Data

Jun. 10, 2008 (CN) .......................... 2008 1 0302077

(51) Int. Cl.
*H03K 17/94* (2006.01)
(52) U.S. Cl. ....................................................... 341/20
(58) Field of Classification Search .................. 200/182, 200/220; 341/20; 250/231, 229; 273/148
See application file for complete search history.

(56) References Cited

U.S. PATENT DOCUMENTS

| | | | | | |
|---|---|---|---|---|---|
| 5,111,039 | A | * | 5/1992 | Froning ..................... | 250/231.1 |
| 5,218,771 | A | * | 6/1993 | Redford ..................... | 33/366.12 |
| 5,818,037 | A | * | 10/1998 | Redford et al. ............... | 250/229 |
| 5,847,824 | A | * | 12/1998 | Ohtomo et al. ............... | 356/249 |
| 7,526,870 | B2 | * | 5/2009 | Klapper et al. ............ | 33/366.23 |
| 7,544,924 | B2 | * | 6/2009 | Foo et al. ....................... | 250/221 |
| 2002/0134925 | A1 | * | 9/2002 | Grenlund ................. | 250/227.14 |
| 2003/0193415 | A1 | * | 10/2003 | Fo et al. .......................... | 341/20 |
| 2009/0031570 | A1 | * | 2/2009 | Chang ............................. | 33/354 |

* cited by examiner

*Primary Examiner* — Stephen W Jackson
*Assistant Examiner* — Angela Brooks
(74) *Attorney, Agent, or Firm* — Altis Law Group, Inc.

(57) ABSTRACT

An exemplary controller includes a transparent chamber, an opaque liquid, and four photoelectric sensors. The transparent chamber includes four pipe-shaped arms. The four pipe-shaped arms are in a common plane parallel to the vertical direction and extend away from a common end towards vertical up, horizontal left, vertical down, and horizontal right directions to form four closed distal ends when the controller is in a normal orientation. The opaque liquid is sealed within the transparent chamber so that an air bubble is formed within the transparent chamber. The four photoelectric sensors are U-shaped and cap the four closed distal ends respectively and are configured for detecting which closed distal end the air bubble is located, thereby outputting electrical signals to be coded as control signals.

10 Claims, 3 Drawing Sheets

| 16a | 16b | 16c | 16d | Functionality |
|---|---|---|---|---|
| 1 | 1 | 1 | 1 | Controller activated |
| 1 | 0 | 0 | 1 | Music player started up |
| 1 | 0 | 1 | 0 | Play forward |
| 1 | 1 | 0 | 0 | Play backward |
| 0 | 1 | 1 | 0 | Music player closed |
| 0 | 1 | 1 | 1 | Controller closed |

Predetermined interval=5s

FIG. 3

CONTROLLER AND ELECTRONIC DEVICE USING THE SAME

BACKGROUND

1. Technical Field

The present disclosure relates to controllers and, particularly, to a controller and an electronic device using the same.

2. Description of the Related Art

Electronic devices featuring multiple functions may have complicated keypads or the keypads, due to extra keys to accommodate the additional functions, may be larger than normal for operating the devices.

Therefore, it is desirable to provide a controller and an electronic device using the same, which can overcome the above-mentioned problems.

BRIEF DESCRIPTION OF THE DRAWINGS

FIG. 3 is a table showing how the controller controls the electronic device, according to the exemplary embodiment.

DETAILED DESCRIPTION OF THE EMBODIMENTS

Embodiments of the present controller and electronic device will now be described in detail with references to the accompanying drawings.

Figure 1:
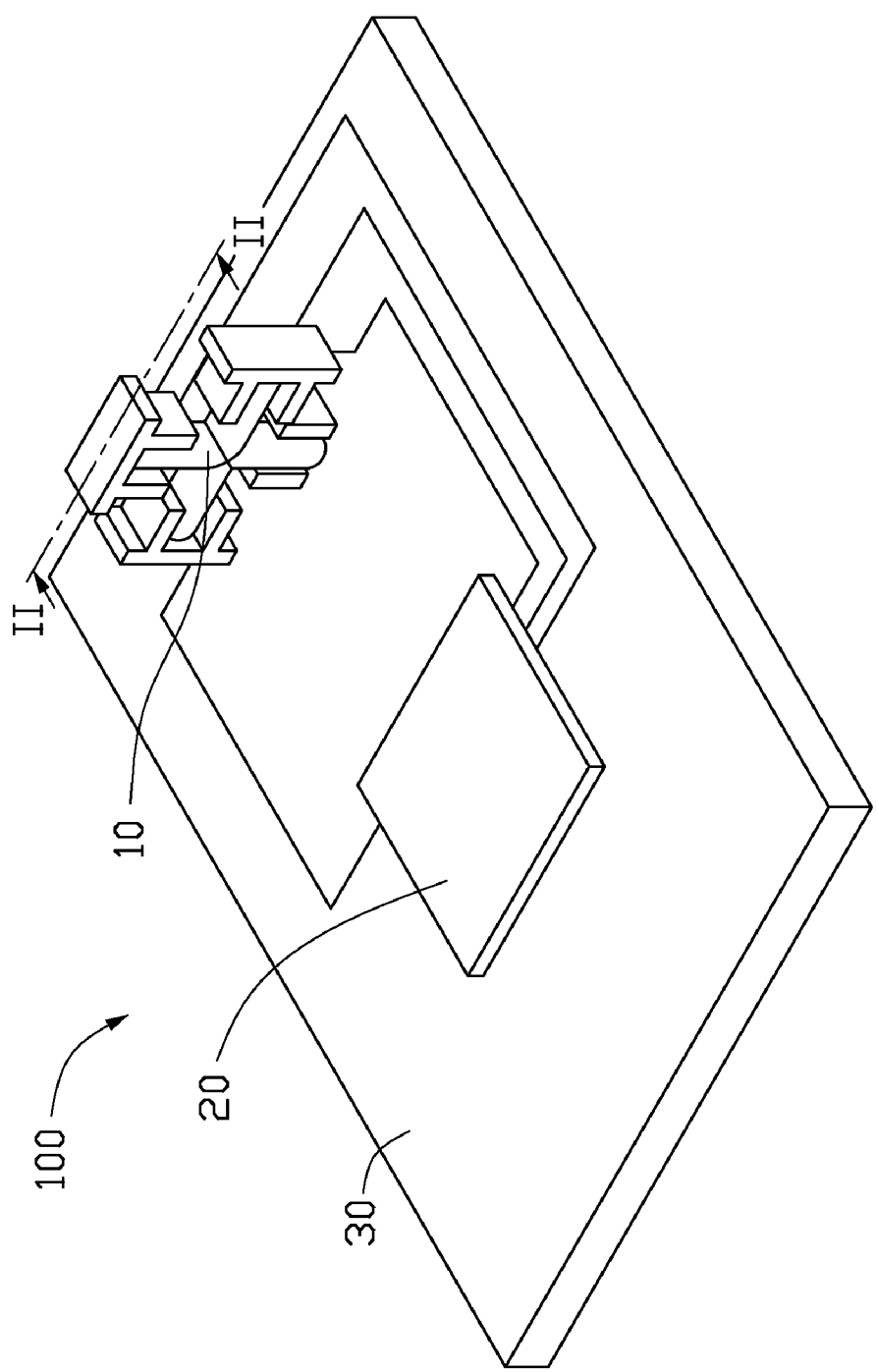
FIG. 1 is an isometric, schematic view of an electronic device having a controller, according to an exemplary embodiment.

Referring to FIG. 1, an electronic device 100, such as a mobile phone, a gaming device, or a multimedia player, according to an exemplary embodiment, includes a controller 10, a processor 20, and a circuit board 30. The controller 10 is electrically connected to the processor 20 via the circuit board 30. The controller 10 is configured for generating electrical signals according to the orientations of the electronic device 100. The processor 20 is configured for coding the generated electrical signals of the controller 10, thereby controlling the electronic device 100 based upon the coded electrical signals to implement various corresponding functions.

Figure 2:
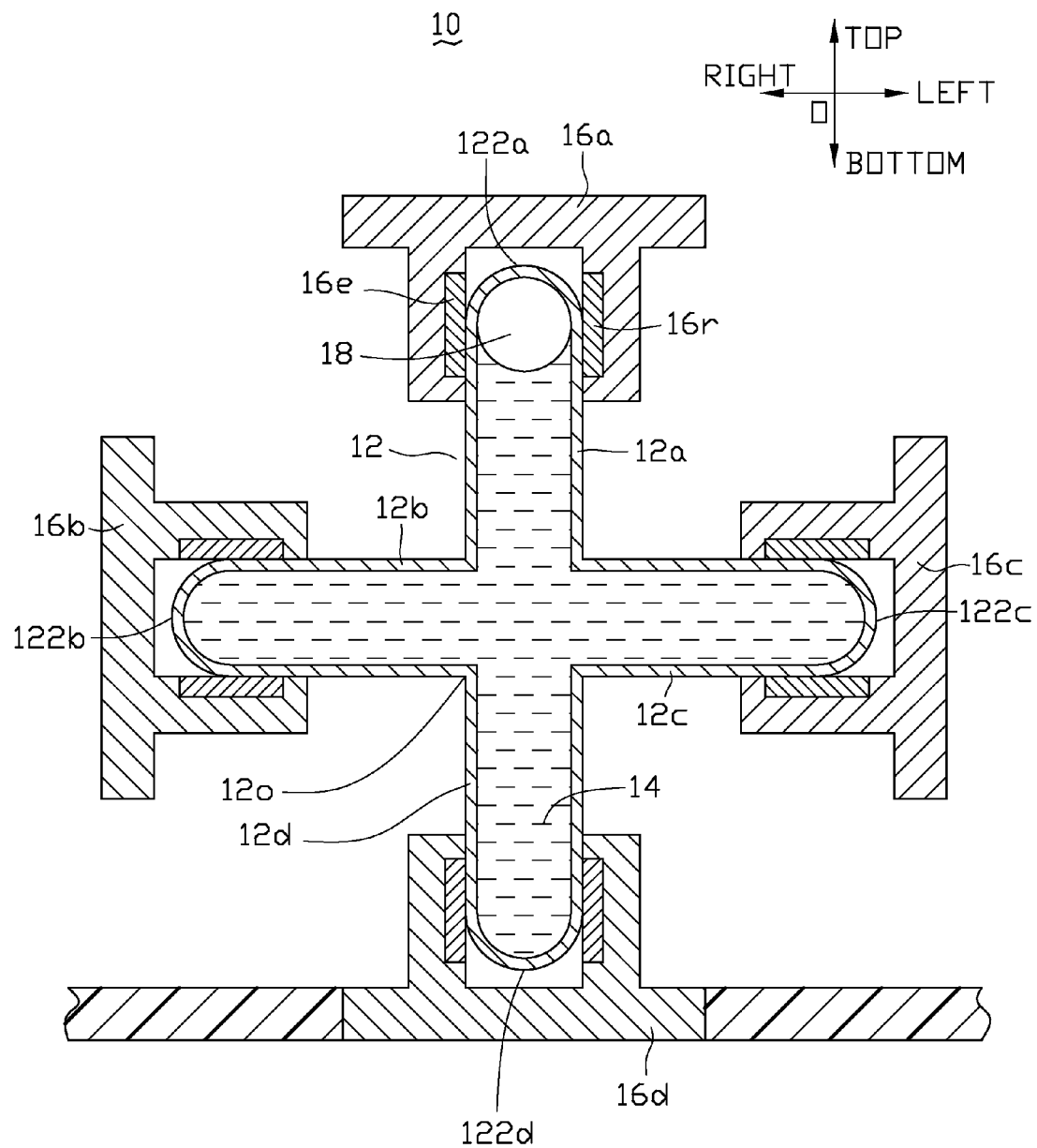
FIG. 2 is an enlarged, cross-sectional view of the controller taken along line II-II of FIG. 1.

Also referring to FIG. 2, the controller 10 includes a transparent chamber 12, a non-transparent liquid 14, and four photoelectric sensors 16a, 16b, 16c, 16d, e.g., trough type photoelectric sensors. The transparent chamber 12 includes four pipe-shaped arms 12a, 12b, 12c, 12d branching off in different orientations. In this embodiment, the four pipe-shaped arms 12a, 12b, 12c, 12d are in a common plane, e.g., a plane O (see FIG. 2) parallel to the vertical direction, and extending away from a common end 12o towards the top (vertical up), left (horizontal), bottom (vertical down), and right (horizontal) directions to form four close distal ends 122a, 122b, 122c, 122d when the electronic device 100 is in a normal orientation. This orientation is defined as the normal direction of the controller 10 and can be thought of as a mobile phone with its front surface facing upwards. The non-transparent liquid 14, e.g., mercury, is sealed within the transparent chamber 12 so that an air bubble 18 is formed within the transparent chamber 12. The four photoelectric sensors 16a, 16b, 16c, 16d are U-shaped and cap the four closed distal ends 122a, 122b, 122c, 122d respectively. Each of the photoelectric sensors 16a, 16b, 16c, 16d, includes a light emitter 16e and a light receiver 16r. The light emitter 16e and the light receiver 16r are fixed in an opposite fashion so that light emitted by the light emitter 16e can cross the respective distal end to the light receiver 16r when the air bubble 18 is located at that distal end.

When the controller 10 is oriented so that a closed distal end, e.g., the closed distal end 122a, is pointing upwards (in the normal orientation), the air bubble 18 is adjacent to the closed distal end that is pointing upwardly, e.g., the closed distal end 122a, because of gravity. The light receiver 16r of the corresponding photoelectric sensor, e.g., the photoelectric sensor 16a, can therefore receive light from its matching light emitter 16e and generate an electronic signal, e.g., a pulse. The light from the three photoelectric sensors, e.g., the photoelectric sensors 16b, 16c, 16d is all blocked by the non-transparent liquid 18, and as a result, no electrical signal is generated. As a consequence, the generation of the electrical signal(s) of the photoelectric sensors 16a, 16b, 16c, 16d, can be controlled by the orientation of the controller 10. Thus functional processes of the electronic device 100 can be controlled by changing the orientation of the controller.

In order to provide a better understanding of the control of the electronic device 100, a detailed example is given below. In the detailed example, the electronic device 100 is a mobile phone and has a software music player installed therein.

Referring to FIG. 3, the processor 20 can be programmed to respond to the electrical signals generated by the controller 10 and direct the electronic device 100 to perform certain functions using the following procedures:

1: When the four electrical signals respectively generated by the four photoelectric sensors 16a, 16b, 16c, 16d are detected/received within a predetermined time interval, the processor 10 codes the four electrical signals as a first control signal "controller activated" and activates the controller 10 (see the first line of the table). Rotating the electronic device 100 one rotation can activate the controller 10. The predetermined time interval to complete the rotation can be set by the manufacturer or the user. In this detailed example, the predetermined interval is 5 seconds. To activate the controller 10 the detected electrical signals may be required to come in a predetermined order or in any order. Prior to the controller 10 being activated in the manner as mentioned above, the electronic device 100 may be controlled by other controllers, e.g., a keypad of the mobile phone. Alternatively, instead of activating the controller 10 by rotation, the controller 10 can be activated by other means, such as a switch.

2: When the two electronic signals respectively generated by the two photoelectric sensors 16a, 16d are detected to come in a predetermined order or in any order, within the predetermined time interval, the processor 20 is programmed to interpret the two electrical signals as a second control signal "player started up" and starts up the software music player (see the second line of the table). Specifically, rotating the electronic device 100 upwards and downwards can start up the music player.

3: When two electrical signals respectively generated by the photoelectric sensors 16a, 16c are detected in a predetermined order or in any order within the predetermined time interval, the processor 20 interprets the two electrical signals as a third control signal "play forward" and controls the music player to activate the play forward function (see the third line of the table). Specifically, the predetermined order rotating the electronic device 100 clockwise approximately 90 degrees from the normal orientation can trigger the "play forward" functionality of electronic device 100.

4: When two electrical signals respectively generated by the photoelectric sensors 16a, 16b are detected in a predetermined order or in any order in the predetermined time interval, the processor 20 interprets the two electrical signals as a fourth control signal "play backward" and controls the music player to play backward (see the fourth line of the table). Specifically, the predetermined order rotating the electronic device counter-clockwise approximately 90 degrees can trigger the "play backward" functionality of the electronic device 100.

5: Control signals "play forward" and "play backward" can cancel each other. In order words, a "play backward" control signal can be used to cancel an activated "play forward" function.

6: When two electrical signals respectively generated by the photoelectric sensors 16b, 16c are detected in a predetermined order or in any order in the predetermined time interval, the processor 20 interprets the two electrical signals as a fifth control signal "player closed" and closes the software music player (see the fifth line of the table).

7: When three electrical signals respectively generated by the photoelectric sensors 16b, 16c, 16d are detected in any order or in a predetermined order in the predetermined time interval, the processor 20 interprets the three electrical signal as a sixth control signal "controller closed" and closes the controller 10 (see the sixth line of the table). In operation, the electronic device 10 is oriented so that the air bubble 18 is located in the distal end 16b for more than the predetermined interval, and is subsequently turned to position the air bubble 18 to the distal end 16c, 16d in the predetermined interval.

Additional functionalities of the electronic device 100 can be, for example, "next piece" and "last piece" for the software music player, "camera started up" and "camera closed" for a camera (if the electronic device 100 has one) can also be controlled by coding the electrical signals in other alternative embodiments. For example, the processor 20 can be programmed to interpret two electrical signals respectively generated by the photoelectric sensors 16b, 16d as the control signal "next piece", two signals respectively generated by the photoelectric sensors 16c, 16d as the control signal "last piece", three signals respectively generated by the photoelectric sensors 16a, 16b, 16c as the control signal "camera started up", and three control signals respectively generated by the photoelectric sensors 16a, 16b, 16d as the control signal "camera closed".

The controller 10 is not limited by this embodiment. In other alternative embodiments, the controller 10 can include fewer or more arms, wherein the directions of the arms can be any direction. For example, an alternative controller may include six arms radially branching off in a three-dimensional coordinate fashion.

The controller 10 can be miniaturized and received within a housing of the electronic device 100. Therefore, the size of the keypad can be reduced. Furthermore, because the control of some or all functionalities is transferred to the controller, the keypad of the electronic device 100 can be simplified or, even, replaced by the controller 10.

It will be understood that the above particular embodiments and methods are shown and described by way of illustration only. The principles and the features of the present invention may be employed in various and numerous embodiments thereof without departing from the scope of the invention as claimed. The above-described embodiments illustrate the scope of the invention but do not restrict the scope of the invention.

What is claimed is:

1. A controller comprising:
   a transparent chamber comprising a plurality of pipe-shaped arms branching off in different directions to form a plurality of closed distal ends respectively;
   a non-transparent liquid sealed in the transparent chamber so that an air bubble is formed within the transparent chamber and the air bubble is naturally located at a closed distal end that is located at the highest orientation due to the gravitational effect on the non-transparent liquid; and
   a plurality of photoelectric sensors capped onto the closed distal ends respectively, each of the plurality of photoelectric sensors being configured for detecting which closed distal end the air bubble is located, thereby outputting a plurality of electrical signals.

2. The controller as claimed in claim 1, wherein the number of the pipe-shaped arms is four, the pipe-shaped arms being in a common plane parallel to the vertical direction and each arm respectively branching upward, downward, left, and right directions when the controller is in a normal orientation.

3. The controller as claimed in claim 1, wherein the photoelectric sensors are trough shape type photoelectric sensor.

4. The controller as claimed in claim 1, wherein the photoelectric sensors comprise a light emitter and a light receiver, the light emitter and the light receiver being fixed in an opposite fashion.

5. The controller as claimed in claim 1, wherein the electrical signals are pulses.

6. The controller as claimed in claim 1, wherein the non-transparent liquid comprises mercury.

7. An electronic device comprising:
   a controller comprising:
      a transparent chamber comprising a plurality of pipe-shaped arms branching off in different directions to form a plurality of closed distal ends respectively;
      a non-transparent liquid sealed in the transparent chamber so that an air bubble is formed within the transparent chamber and the air bubble is naturally located at a closed distal end that is located at the highest orientation due to the gravitational effect on the non-transparent liquid; and
      a plurality of photoelectric sensors capped onto the closed distal ends respectively, each of the plurality of photoelectric sensors being configured for detecting which closed distal end the air bubble is located, thereby outputting a plurality of electrical signals; and
   a processor configured for coding the output electrical signal as a control signal.

8. The electronic device as claimed in claim 7, further comprising a circuit board, the processor being electrically coupled to the controller via the circuit board.

9. The electronic device as claimed in claim 8, wherein the number of the pipe-shaped arms is four, the pipe-shaped arms being in a common plane parallel to the vertical direction and each arm respectively branching upward, downward, left, and right directions when the controller is in a normal orientation.

10. The electronic device as claimed in claim 9, wherein the processor codes electrical signals output in a predetermined interval as a control signal.

* * * * *